US010298284B2

United States Patent
Gharavi et al.

(10) Patent No.: US 10,298,284 B2
(45) Date of Patent: May 21, 2019

(54) FULL DUPLEX TRANSCEIVERS

(71) Applicant: Movandi Corporation, Newport Beach, CA (US)

(72) Inventors: Sam Gharavi, Irvine, CA (US); Seunghwan Yoon, Irvine, CA (US); Ahmadreza Rofougaran, Newport Coast, CA (US)

(73) Assignee: Movandi Corporation, Newport Beach, CA (US)

( * ) Notice: Subject to any disclaimer, the term of this patent is extended or adjusted under 35 U.S.C. 154(b) by 304 days.

(21) Appl. No.: 15/464,174

(22) Filed: Mar. 20, 2017

(65) Prior Publication Data

US 2018/0269919 A1 Sep. 20, 2018

(51) Int. Cl.
| | |
|---|---|
| *H04B 1/40* | (2015.01) |
| *H04B 7/06* | (2006.01) |
| *H04B 7/10* | (2017.01) |
| *H04L 5/14* | (2006.01) |
| *H04B 7/08* | (2006.01) |

(52) U.S. Cl.
CPC ............... *H04B 1/40* (2013.01); *H04B 7/06* (2013.01); *H04B 7/10* (2013.01); *H04B 7/0617* (2013.01); *H04B 7/0837* (2013.01); *H04L 5/14* (2013.01)

(58) Field of Classification Search
CPC ... H04B 1/40; H04B 7/06; H04B 7/10; H04B 7/0617

USPC ............................................................ 455/73
See application file for complete search history.

(56) References Cited

U.S. PATENT DOCUMENTS

| | | | |
|---|---|---|---|
| 2013/0301487 A1* | 11/2013 | Khandani | H04W 16/14 370/278 |
| 2014/0071018 A1* | 3/2014 | Pan | H01Q 1/20 343/867 |
| 2014/0162568 A1* | 6/2014 | Laskar | H01L 28/75 455/67.14 |

* cited by examiner

*Primary Examiner* — Ayodeji O Ayotunde
(74) *Attorney, Agent, or Firm* — Farjami & Farjami LLP

(57) ABSTRACT

A full duplex transceiver includes a phased array antenna panel transmitter and a phased array antenna panel receiver. The full duplex transceiver may include at least one dummy antenna row situated between the phased array antenna panel transmitter and the phased array antenna panel receiver, the at least one dummy antenna row having at least one dummy antenna connected to a terminating resistor. The phased array antenna panel transmitter forms a desired radio frequency (RF) transmit beam at a target angle, and forms a null at an angle so as to minimize reception of offending transmit signals at said phased array antenna panel receiver. The phased array antenna panel receiver may receive offending transmit signals from the phased array antenna panel transmitter and a desired receive signal at a combined input power level. The full duplex transceiver may include an automatic gain controller configured to adjust a receiver chain of the phased array antenna panel receiver such that the receiver chain maintains operation in a linear region at the combined input power level.

20 Claims, 7 Drawing Sheets

FULL DUPLEX TRANSCEIVERS

RELATED APPLICATION(S)

The present application is related to U.S. patent application Ser. No. 15/225,071, filed on Aug. 1, 2016, and titled "Wireless Receiver with Axial Ratio and Cross-Polarization Calibration," and U.S. patent application Ser. No. 15/225,523, filed on Aug. 1, 2016, and titled "Wireless Receiver with Tracking Using Location, Heading, and Motion Sensors and Adaptive Power Detection," and U.S. patent application Ser. No. 15/226,785, filed on Aug. 2, 2016, and titled "Large Scale Integration and Control of Antennas with Master Chip and Front End Chips on a Single Antenna Panel," and U.S. patent application Ser. No. 15/255,656, filed on Sep. 2, 2016, and titled "Novel Antenna Arrangements and Routing Configurations in Large Scale Integration of Antennas with Front End Chips in a Wireless Receiver," and U.S. patent application Ser. No. 15/256,038 filed on Sep. 2, 2016, and titled "Transceiver Using Novel Phased Array Antenna Panel for Concurrently Transmitting and Receiving Wireless Signals," and U.S. patent application Ser. No. 15/256,222 filed on Sep. 2, 2016, and titled "Wireless Transceiver Having Receive Antennas and Transmit Antennas with Orthogonal Polarizations in a Phased Array Antenna Panel," and U.S. patent application Ser. No. 15/278,970 filed on Sep. 28, 2016, and titled "Low-Cost and Low-Loss Phased Array Antenna Panel," and U.S. patent application Ser. No. 15/279,171 filed on Sep. 28, 2016, and titled "Phased Array Antenna Panel Having Cavities with RF Shields for Antenna Probes," and U.S. patent application Ser. No. 15/279,219 filed on Sep. 28, 2016, and titled "Phased Array Antenna Panel Having Quad Split Cavities Dedicated to Vertical-Polarization and Horizontal-Polarization Antenna Probes," and U.S. patent application Ser. No. 15/335,034 filed on Oct. 26, 2016, titled "Lens-Enhanced Phased Array Antenna Panel," and U.S. patent application Ser. No. 15/335,179 filed on Oct. 26, 2016, and titled "Phased Array Antenna Panel with Configurable Slanted Antenna Rows," and U.S. patent application Ser. No. 15/355,967 filed on Nov. 18, 2016, and titled "Phased Array Antenna Panel with Enhanced Isolation and Reduced Loss," and U.S. patent application Ser. No. 15/356,172 filed on Nov. 18, 2016, and titled "Phased Array Antenna Panel Having Reduced Passive Loss of Received Signals," and U.S. patent application Ser. No. 15/432,018 filed on Feb. 14, 2017, and titled "Outphasing Transmit and Receive Wireless Systems Having Dual-Polarized Antennas," and U.S. patent application Ser. No. 15/432,091 filed on Feb. 14, 2017, and titled "Outphasing Transmitters with Improved Wireless Transmission Performance and Manufacturability," and U.S. patent application Ser. No. 15/432,185 filed on Feb. 14, 2017, and titled "Multi-Beam Outphasing Transmitters." The disclosures of all of these related applications are hereby incorporated fully by reference into the present application.

BACKGROUND

Conventional radio frequency (RF) wireless transceivers communicate utilizing half duplex schemes such as frequency division duplexing (FDD) and time division duplexing (TDD) to separate transmit and receive signals by frequency and time. In a full duplex transceiver, transmit and receive signals occur at the same frequency and time. As a result, full duplex transceivers improve communication capacity compared to half duplex transceivers. On the other hand, full duplex transceivers introduce offending coupling between the transmitter and the receiver in the same transceiver.

In one solution, an offending transmit signal is duplicated at the receiver, and the duplicate signal is subtracted from the receive signal. This solution is difficult to implement, particularly because the duplicate signal does not match the portion of the offending transmit signal in the receive signal. The coupling channel between the transmitter and the receiver, and the effect on the offending transmit signal, are unpredictable. Additionally, the offending transmit signal can saturate RF components in the receiver chain and cause nonlinearities. Moreover, solutions need be specifically developed for full duplex transceivers in 5G wireless communications (5th generation mobile networks or 5th generation wireless systems) that employ phased array antenna panels for beamforming.

Thus, there is a need in the art to use a full duplex transceiver having reduced offending coupling between a transmitter and a receiver in the same transceiver to achieve a robust wireless communication system, and more specifically to achieve a robust 5G wireless communication system, that overcomes the deficiencies in the art.

SUMMARY

The present disclosure is directed to full duplex transceivers, substantially as shown in and/or described in connection with at least one of the figures, and as set forth in the claims.

DETAILED DESCRIPTION

Figure 1:
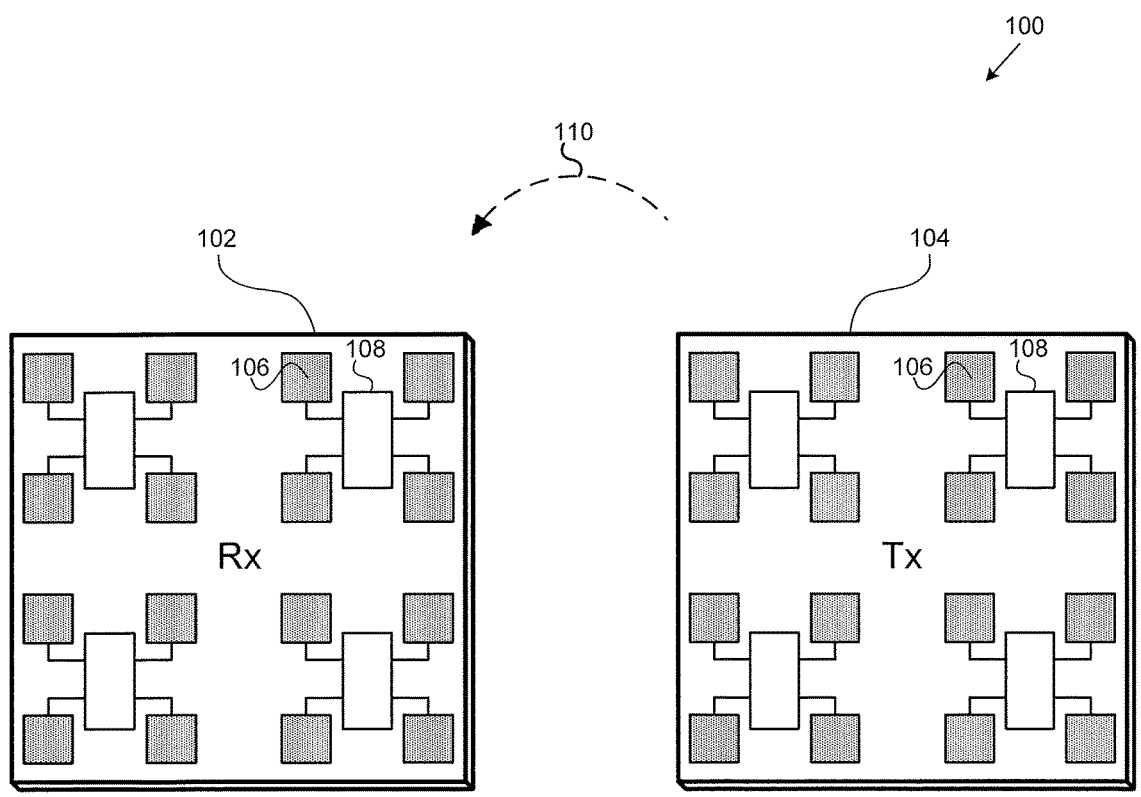
FIG. 1 illustrates a layout diagram of a portion of an exemplary full duplex transceiver according to one implementation of the present application.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 illustrates a layout diagram of a portion of an exemplary full duplex transceiver according to one implementation of the present application. As illustrated in FIG. 1, full duplex transceiver 100 includes phased array antenna panel receiver 102, phased array antenna panel transmitter 104, antennas 106, and radio frequency (RF) front end chips 108. In the present implementation, phased array antenna panel receiver 102 and phased array antenna panel transmitter 104 may be multi-layer printed circuit boards (PCBs). As illustrated in FIG. 1, antennas 106 are formed on the front surfaces of phased array antenna panel receiver 102 and phased array antenna panel transmitter 104. In the present implementation, antennas 106 have a square shape and are arranged in grid patterns on the front surfaces of phased array antenna panel receiver 102 and phased array antenna panel transmitter 104.

In one implementation, for transmitting and receiving signals at 28.5 GHz (i.e., λ=10.5 mm), each antenna 106 may need an area of at least a quarter wavelength (i.e., λ/4=2.6 mm) by a quarter wavelength (i.e., λ/4=2.6 mm). As illustrated in FIG. 1, antennas 106 in full duplex transceiver 100 may each have a square shape having dimensions of 2.6 mm by 2.6 mm, for example. In one implementation, each adjacent pair of antennas 106 may be separated by a distance of a multiple integer of the quarter wavelength (i.e., n*λ/4), such as 2.6 mm, 5.2 mm, 7.8 mm and etc. In practice, for example when used in conjunction with 5G wireless communications, full duplex transceiver 100 may have one hundred and forty four (144) antennas 106.

Antennas 106 may be, for example, cavity antennas or patch antennas or other types of antennas. The shape of antennas 106 may correspond to, for example, the shape of an opening in a cavity antenna or the shape of an antenna plate in a patch antenna. In practice, antenna probes (not shown in FIG. 1) may be situated in or over cubical or cylindrical cavities that accommodate more efficient transmission or reception of RF signals. Thus, antenna elements 106 in FIG. 1 may represent a top view of a cubical cavity housing antenna probes. Examples of various antennas that can be used in various implementations of the present application are shown and described in U.S. patent application Ser. No. 15/278,970 filed on Sep. 28, 2016 and titled "Low-Cost and Low-Loss Phased Array Antenna Panel," and U.S. patent application Ser. No. 15/279,171 filed on Sep. 28, 2016 and titled "Phased Array Antenna Panel Having Cavities with RF Shields for Antenna Probes." The disclosures in these related applications are hereby incorporated fully by reference into the present application. In one implementation, antennas 106 may be dual-polarized antennas having vertically-polarized probes and horizontally-polarized probes. In one implementation, antennas 106 may have a shape other than a square, such as a circle. In one implementation, antennas 106 may be arranged in a pattern other than a grid. In one implementation, the distance between one antenna and an adjacent antenna may be less than or greater than a quarter wavelength (i.e., less than or greater than λ/4), or the distance between each antenna and an adjacent antenna might not be a fixed distance. In one implementation, the distance between phased array antenna panel receiver 102 and phased array antenna panel transmitter 104 may be approximately three centimeters (3 cm). In one implementation, phased array antenna panel receiver 102 and phased array antenna panel transmitter 104 may be integrated on a single PCB.

Although FIG. 1 shows that phased array antenna panel receiver 102 and phased array antenna panel transmitter 104 each have sixteen (16) antennas 106, only a portion of phased array antenna panel receiver 102 and phased array antenna panel transmitter 104 are shown in FIG. 1. In practice, for example when used in conjunction with 5G wireless communications (5th generation mobile networks or 5th generation wireless systems), phased array antenna panel receiver 102 and phased array antenna panel transmitter 104 may be much larger, and may each have one hundred and forty four (144) antennas 106, arranged, for example, in twelve (12) by twelve (12) grid patterns. When used in conjunction with commercial geostationary communication satellites or low earth orbit satellites, phased array antenna panel receiver 102 and phased array antenna panel transmitter 104 may be even larger, and have, for example, four hundred (400) antennas 106. In other examples, phased array antenna panel receiver 102 and phased array antenna panel transmitter 104 may have any other number of antennas 106. In general, the performance of phased array antenna panel receiver 102 and phased array antenna panel transmitter 104 improves with the number of antennas 106.

As illustrated in FIG. 1, RF front end chips 108 are formed on the front surfaces of phased array antenna panel receiver 102 and phased array antenna panel transmitter 104. In the present implementation, each RF front end chip 108 is associated with four antennas 106. In various implementations, a single RF front end chip 108 may be associated with six, eight, sixteen, or any number of antennas. Various examples of association of RF front end chips with different numbers and arrangements of antennas is described in U.S. patent application Ser. No. 15/255,656 filed on Sep. 2, 2016, and titled "Novel Antenna Arrangements and Routing Configurations in Large Scale Integration of Antennas with Front End Chips in a Wireless Receiver." The disclosure in this related application is hereby incorporated fully by reference into the present application. In the present implementation, RF front end chips 108 are configured to provide amplitude and phase shifted signals to antennas 106 in response to control signals received from a master chip (not shown in FIG. 1) in phased array antenna panel receiver 102 or phased array antenna panel transmitter 104. RF front end chips 108 may be connected to a master chip using a plurality of control and data buses routed through various layers of PCB. In the present implementation, phased array antenna panel receiver 102 and phased array antenna panel transmitter 104 employ RF front end chips 108 coupled to associated antennas 106 to form beams for reception and transmission. In one implementation, the beams are formed fully electronically by means of phase and amplitude control circuits in RF front end chips 108 associated with antennas 106. An example of beam forming using phase and amplitude control circuits utilizing a phased array antenna panel is described in U.S. patent application Ser. No. 15/226,785 filed on Aug. 2, 2016, and titled "Large Scale Integration and Control of Antennas with Master Chip and Front End Chips on a Single Antenna Panel." The disclosure in this related application is hereby incorporated fully by reference into the present application. Thus, phased array antenna panel receiver 102 and phased array antenna panel transmitter 104 can provide fully electronic beamforming without the use of mechanical parts.

When phased array antenna panel receiver 102 of full duplex transceiver 100 receives a desired receive signal (from a transmitter not shown in FIG. 1), the power level of the desired receive signal may range from, for example, negative eighty decibel-milliwatts to negative twenty decibel-milliwatts (i.e., −80 dBm to −20 dBm). Concurrently, phased array antenna panel transmitter 104 of full duplex transceiver 100 may send a transmit signal 110 (to a receiver not shown in FIG. 1). Because phased array antenna panel receiver 102 and phased array antenna panel transmitter 104 operate at the same frequency, their proximity can cause offending coupling between phased array antenna panel transmitter 104 and phased array antenna panel receiver 102. This coupling can occur through air, substrate, or ground. As shown in FIG. 1, phased array antenna panel receiver 102 receives offending transmit signals 110 from phased array antenna panel transmitter 104. In various situations, offending transmit signals 110 may be formed at an angle that substantially coincides with an angle of an RF receive beam or a sidelobe angle of phased array antenna panel receiver 102, which would undesirably increase reception of offending transmit signals 110 by receiver 102. Thus, in practice, offending transmit signals 110 interfere with the operation of receiver 102 and prevent full duplex transceiver communication.

Figure 2:
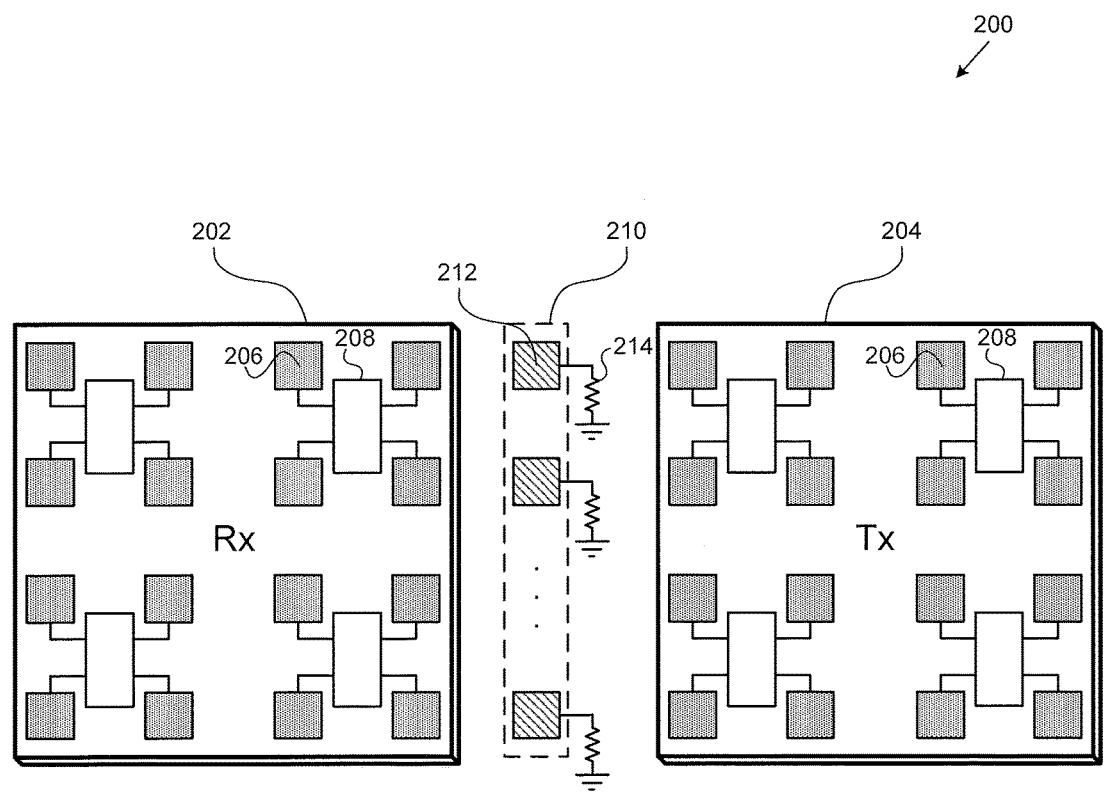
FIG. 2 illustrates a layout diagram of a portion of an exemplary full duplex transceiver according to one implementation of the present application.

FIG. 2 illustrates a layout diagram of a portion of an exemplary full duplex transceiver according to one implementation of the present application. As illustrated in FIG. 2, full duplex transceiver 200 includes phased array antenna panel receiver 202, phased array antenna panel transmitter 204, antennas 206, RF front end chips 208, dummy antenna row 210, dummy antennas 212, and terminating resistors 214. The various implementations and examples of antenna shapes, sizes, numbers, and types, and RF front end chip numbers, associations, and beamforming, discussed in relation to full duplex transceiver 100 in FIG. 1 may also apply to full duplex transceiver 200 shown in FIG. 2.

As shown in FIG. 2, dummy antenna row 210 is situated between phased array antenna panel receiver 202 and phased array antenna panel transmitter 204. In the present implementation, dummy antenna row 210 is situated at an edge of phased array antenna panel receiver 202. Dummy antenna row 210 may be a row of twelve dummy antennas 212, a row of sixteen dummy antennas 212, or any other number of dummy antennas 212. In the present implementation, dummy antennas 212 have a square shape and are arranged in a grid pattern aligned with antennas 206. In one implementation, the distance between one dummy antenna and an adjacent dummy antenna is a fixed distance, such as a quarter wavelength (i.e., $\lambda/4$). In one implementation, for a wireless transmitter transmitting signals at 28.5 GHz (i.e., $\lambda$=10.5 mm), each dummy antenna may need an area of at least a quarter wavelength (i.e., $\lambda/4$=2.6 mm) by a quarter wavelength (i.e., $\lambda/4$=2.6 mm). Dummy antennas 212 may each have a square shape having dimensions of 2.6 mm by 2.6 mm, for example. Dummy antennas 212 may be, for example, cavity antennas or patch antennas or other types of antennas. The shape of dummy antennas 212 may correspond to, for example, the shape of an opening in a cavity antenna or the shape of an antenna plate in a patch antenna. In practice, antenna probes (not shown in FIG. 2) may be situated in or over cubical or cylindrical cavities that accommodate more efficient transmission or reception of RF signals. Thus, dummy antenna elements 212 in FIG. 2 may represent a top view of a cubical cavity housing antenna probes. Examples of various antennas that can be used in various implementations of the present application are shown and described in U.S. patent application Ser. No. 15/278,970 filed on Sep. 28, 2016 and titled "Low-Cost and Low-Loss Phased Array Antenna Panel," and U.S. patent application Ser. No. 15/279,171 filed on Sep. 28, 2016 and titled "Phased Array Antenna Panel Having Cavities with RF Shields for Antenna Probes." The disclosures in these related applications are hereby incorporated fully by reference into the present application. In one implementation, dummy antennas 212 may be dual-polarized antennas having vertically-polarized probes and horizontally-polarized probes. In one implementation, dummy antennas 212 may have a shape other than a square, such as a circle. In one implementation, dummy antennas 212 may be arranged in a pattern other than a grid. In one implementation, dummy antennas 212 may not be aligned with antennas 206. In one implementation, the distance between one dummy antenna and an adjacent dummy antenna may be less than or greater than a quarter wavelength (i.e., less than or greater than $\lambda/4$), or the distance between each dummy antenna and an adjacent dummy antenna might not be a fixed distance. In one implementation, dummy antenna row 210 may be situated at an edge of phased array antenna panel transmitter 204. Multiple dummy antenna rows 210 may be situated between phased array antenna panel receiver 202 and phased array antenna panel transmitter 204 in full duplex receiver 200.

As illustrated in FIG. 2, dummy antennas 212 in dummy antenna row 210 are connected through terminating resistors 214 to ground. Terminating resistors 214 may be, for example, surface mount resistors. Terminating resistors 214 may be impedance matched to dummy antennas 212. For example, each of terminating resistors 214 and dummy antennas 212 may have an impedance of fifty ohms (i.e., 50Ω). By situating dummy antenna row 210 between phased array antenna panel receiver 202 and phased array antenna panel transmitter 204 and connecting dummy antennas 212 to terminating resistors 214, full duplex transceiver 200 captures and dissipates offending transmit signals 110 that would otherwise interfere with reception of desired receive signals. Significantly, full duplex transceiver 200 can capture and dissipate offending transmit signals 110 at the edges of phased array antenna panel receiver 202 and phased array antenna panel transmitter 204 where the coupling is usually strongest. In addition, where phased array antenna panel receiver 202 and phased array antenna panel transmitter 204 have multiple rows of antennas 206, increasing the number of antennas in the panels decreases the percentage of the total area that dummy antenna row 210 occupies in full duplex transceiver 200. Thus, dummy antenna row 210 is more efficient for larger panels.

Figure 3:
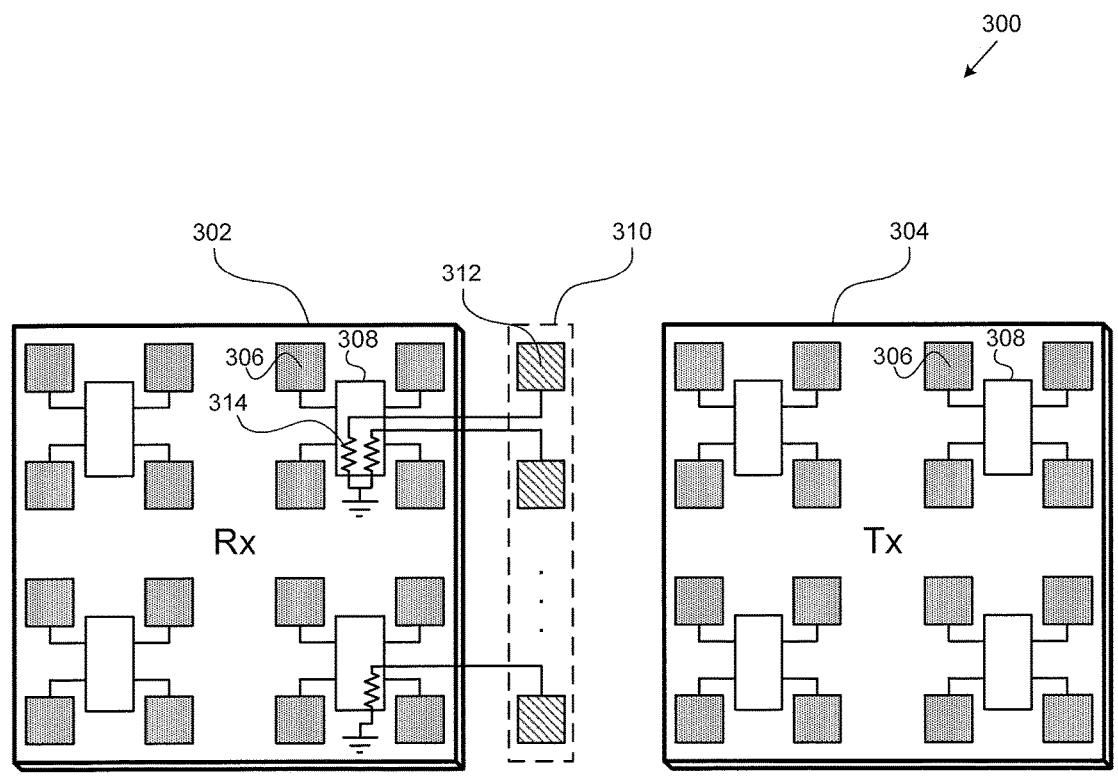
FIG. 3 illustrates a layout diagram of a portion of an exemplary full duplex transceiver according to one implementation of the present application.

FIG. 3 illustrates a layout diagram of a portion of an exemplary full duplex transceiver according to one implementation of the present application. As illustrated in FIG. 3, full duplex transceiver 300 includes phased array antenna panel receiver 302, phased array antenna panel transmitter 304, antennas 306, RF front end chips 308, dummy antenna row 310, dummy antennas 312, and terminating resistors 314. FIG. 3 represents another implementation of the present application where terminating resistors 314 are internal to RF front end chips 308, rather than external—as was the case with respect to FIG. 2. As illustrated in FIG. 3, dummy antennas 312 in dummy antenna row 310 are connected to ground through terminating resistors 314 in RF front end chips 308 of phased array antenna panel receiver 302. In one implementation, dummy antennas 312 may be connected to ground through terminating resistors 314 in RF front end chips 308 of phased array antenna panel transmitter 304. In various implementations, a single RF front end chip may have one, two, three, or any number of internal terminating resistors 314. In one implementation, some terminating resistors 314 may be internal to RF front end chips 308, while other terminating resistors 314 are external. Full duplex transceiver 300 in FIG. 3 may have any other implementations and advantages described above with respect to full duplex transceiver 200 in FIG. 2.

Figure 4:
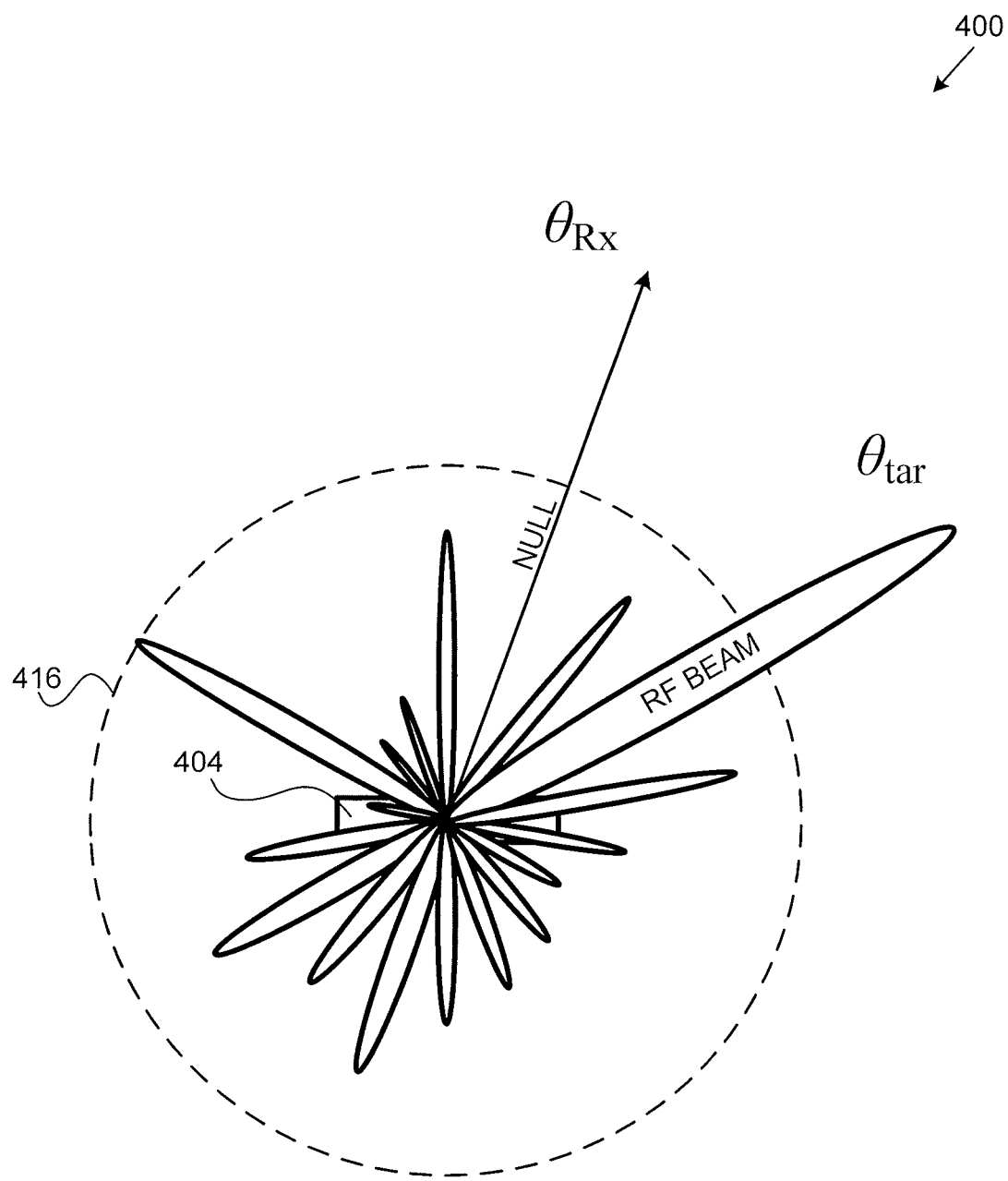
FIG. 4 illustrates a diagram of a portion of an exemplary wireless communication system according to one implementation of the present application.

FIG. 4 illustrates a diagram of a portion of an exemplary wireless communication system according to one implementation of the present application. As illustrated in FIG. 4, wireless communication system 400 includes phased array antenna panel transmitter 404. Phased array antenna panel transmitter 404 in FIG. 4 generally corresponds to phased array antenna panel transmitter 204 in FIG. 2 or phased array antenna panel transmitter 304 in FIG. 3. Phased array antenna panel transmitter 404 can be used in, for example, a base station in 5G that employs phased array antenna panels that can transmit multiple RF beams to various end-users in different directions.

As shown in FIG. 4, phased array antenna panel transmitter 404 forms a desired RF transmit beam at a target angle, defined by $\theta_{tar}$, and forms a null at another angle, defined by $\theta_{Rx}$. Phased array antenna panel transmitter 404 also forms sidelobes below sidelobe level 416. $\theta_{tar}$ is an angle that maximizes reception of a desired transmit signal at a desired end-user receiver. $\theta_{Rx}$ is an angle that minimizes reception of offending transmit signals at phased array antenna panel receiver 202 (or 302). In various implementations, phased array antenna panel transmitter 404 may form more or fewer desired RF transmit beams and/or more or fewer nulls than shown in FIG. 4. In various implementations, the desired RF transmit beams may be narrower or broader than shown in FIG. 4. In one implementation, the angle of a desired RF transmit beam may be optimized to balance increased power at a desired end-user receiver with decreased interference at other receivers. In various implementations, the angle of each desired RF transmit beam may have a fixed separation or a minimum separation from the angle of an adjacent desired RF transmit beam, such as, for example, a fixed separation of fifteen degrees (15°), or a minimum separation of at least fifteen degrees (≥15°).

Figure 5:
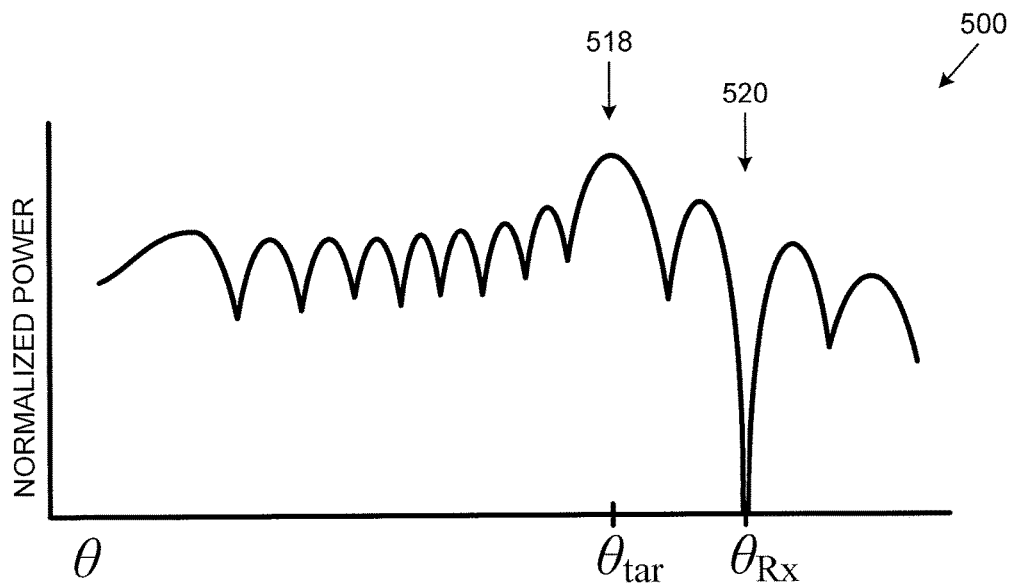
FIG. 5 illustrates a portion of an exemplary radiation pattern according to one implementation of the present application.
Figure 5:
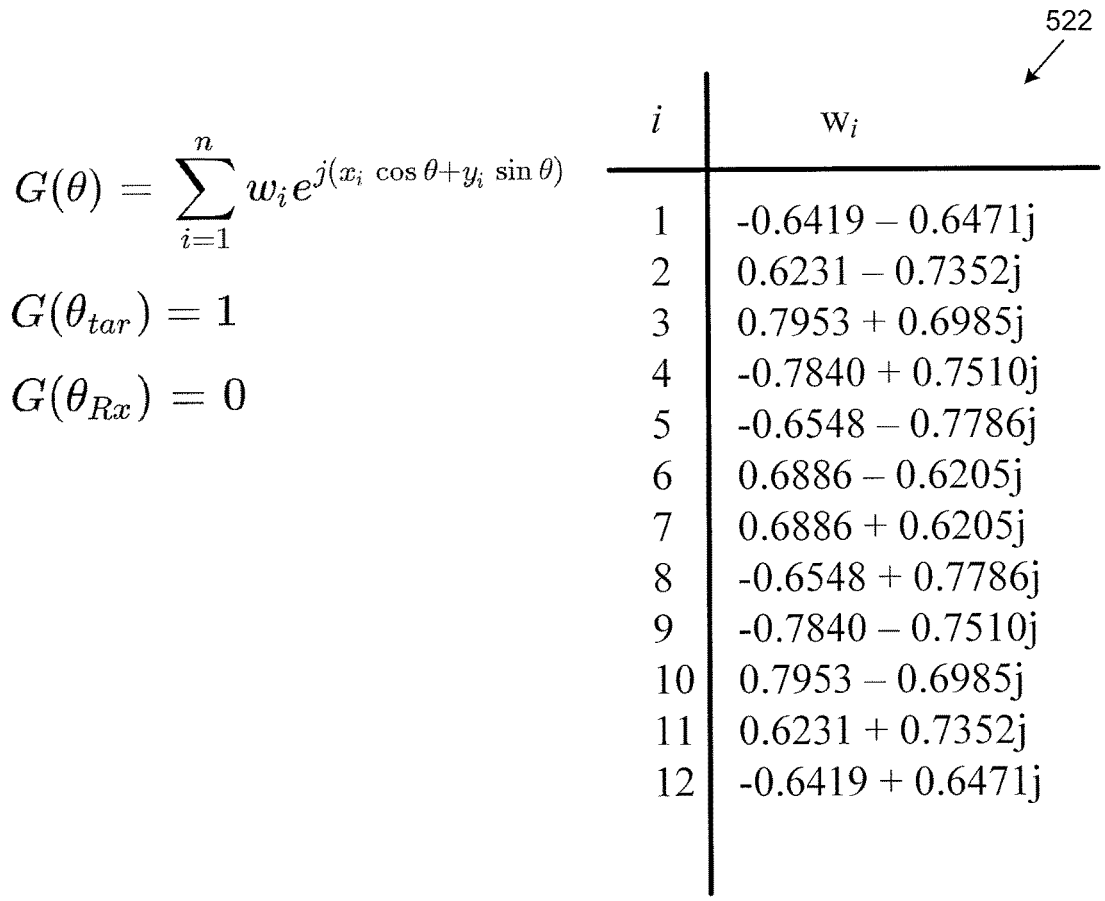

FIG. 5 illustrates a portion of an exemplary radiation pattern according to one implementation of the present application. As illustrated in FIG. 5, radiation pattern 500 represents the power, normalized to its peak, versus angle θ of signals transmitted from a phased array antenna panel transmitter, such as phased array antenna panel transmitter 404 in FIG. 4. Relative dimensions of the normalized power and angle shown in FIG. 5 may be exaggerated for the purposes of illustration. Accordingly, units and scales are omitted in FIG. 5.

As shown in FIG. 5, radiation pattern 500 includes desired RF transmit beam 518, as indicated by the normalized power increasing to a maximum around target angle $\theta_{tar}$. As further shown in FIG. 5, radiation pattern 500 includes null 520, as indicated by the normalized power decreasing to a minimum around $\theta_{Rx}$. Phased array antenna panel transmitter 404 forms desired RF transmit beam 518 and null 520 by assigning complex weights to a plurality of antennas in phased array antenna panel transmitter 404 using phase and amplitude control circuits in RF front end chips. The effect of assigning complex weights in forming desired RF transmit beam 518 and null 520 is defined by equation (1) below:

$$G(\theta) = \sum_{i=1}^{n} w_i e^{j(x_i \cos \theta + y_i \sin \theta)} \quad \text{Equation (1)}$$

where n represents the number of antennas in phased array antenna panel transmitter 404, $w_i$ represents the complex weight of a given antenna, $x_i$ and $y_i$ together represent the position of a given antenna, θ represents the angle of signals transmitted from phased array antenna panel transmitter 404, and G(θ) represents the gain of phased array antenna panel transmitter 404. A full duplex transceiver, such as full duplex transceiver 200 (or 300), can determine complex weights w, using convex optimization, a subset of generic mathematical optimization that solves problems more efficiently by assuming a convex function and minimizing it. In the present implementation, the convex optimization problem is defined by equation (2) below:

minimize max|G(θ)| subject to $G(\theta_{tar})=1$ $G(\theta_{Rx})=0$ $\quad$ Equation (2)

Full duplex transceiver 200 (or 300) may solve the convex optimization problem using any method known in the art, such as an interior point method.

In FIG. 5, table 522 shows exemplary complex weights $w_i$ for different indices i of a phased array antenna panel transmitter having twelve antennas elements (i.e., n=12 in equation (1) above). For the purpose of an example, a complex weight value corresponding to i=1 is shown by the corresponding row in table 522 by table entry–0.6419–0.6471j. As another example, a complex weight value corresponding to i=6 is shown by the corresponding row in table 522 by table entry 0.6886–0.6205j. As yet another example, a complex weight value corresponding to i=12 is shown by the corresponding row in table 522 by table entry –0.6419+0.6471j.

Phased array antenna panel transmitter 404 uses the complex weight values to form desired RF transmit beam 518 at target angle $\theta_{tar}$ and null 520 at angle $\theta_{Rx}$. For example, phased array antenna panel transmitter 404 can use the complex weight values to generate phase shift and amplitude control signals for RF front end chips and associated antennas, such as RF front end chips 208 (or 308) and associated antennas 206 (or 306), to form desired RF transmit beam 518 and null 520. In some implementations, phased array antenna panel transmitter 404 may have more or fewer than twelve antenna elements. In some implementations, phased array antenna panel transmitter 404 may form more or fewer desired RF transmit beams and/or more or fewer nulls than shown in FIG. 5. By forming desired RF transmit beam 518 and null 520, phased array antenna panel transmitter 404 maximizes reception of a desired transmit signal at a desired end-user receiver and minimizes reception of offending transmit signals at a phased array antenna panel receiver. Thus, a full duplex transceiver utilizing phased array antenna panel transmitter 404 can significantly reduce coupling between phased array antenna panel transmitter 404 and a phased array antenna panel receiver. The full duplex transceiver can also be used in conjunction with the dummy antenna row configurations discussed in relation to FIGS. 2 and 3 to further reduce coupling.

Figure 6:
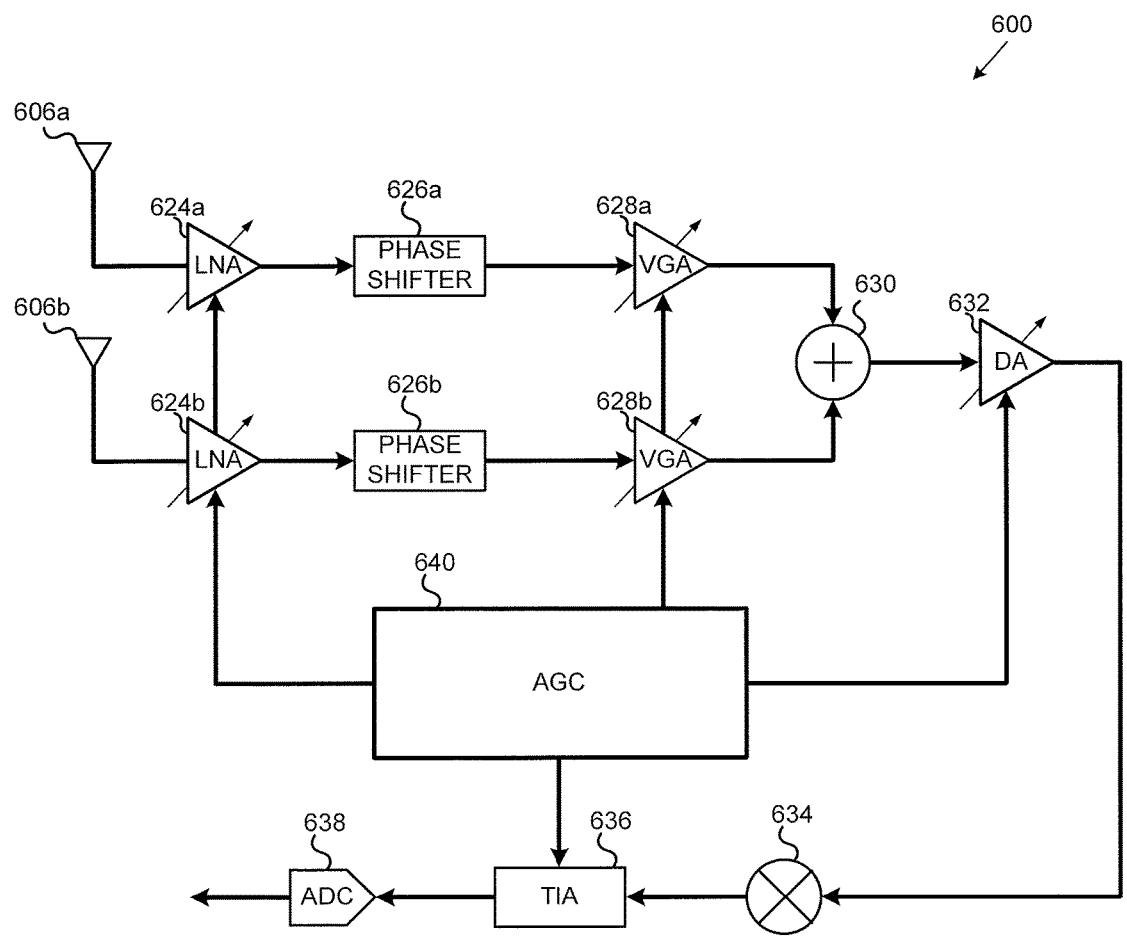
FIG. 6 illustrates a system diagram of a portion of an exemplary receiver chain according to one implementation of the present application.

FIG. 6 illustrates a system diagram of a portion of an exemplary receiver chain according to one implementation of the present application. As illustrated in FIG. 6, receiver chain 600 includes antennas 606a and 606b, low-noise amplifiers (LNAs) 624a and 624b, phase shifters 626a and 626b, variable-gain amplifiers (VGAs) 628a and 628b, combiner 630, driver amplifier (DA) 632, mixer 634, transimpedance amplifier (TIA) 636, analog-to-digital converter 638, and automatic gain controller 640. Receiver chain 600 in FIG. 6 may generally correspond to a portion of phased array antenna panel receiver 202 in FIG. 2 (or 302 in FIG. 3).

As shown in FIG. 6, automatic gain controller 640 is connected to LNAs 624a and 624b VGAs 628a and 628b, DA 632, and TIA 636. In the present implementation, LNAs 624a and 624b are linear up to negative eight decibel-milliwatts (−8 dBm) output power, VGAs 628a and 628b are linear up to negative eight decibel-milliwatts (−8 dBm) output power, DA 632 is linear up to negative eight decibel-milliwatts (−8 dBm) output power, mixer 634 is linear up to ten decibel-milliwatts (10 dBm) output power, and TIA 636 is linear up to ten decibel-milliwatts (10 dBm) output power. As used herein, the term "linear up to" refers to the output power where the gain compresses by one decibel, commonly referred to as the one-decibel compression point (i.e., $OP_{1dB}$). In a conventional transceiver, RF components, such as amplifiers and mixers, in a receiver chain are configured to receive a desired receive signal at a receive signal power level. In a full duplex transceiver, offending transmit signals, such as offending transmit signals 110, cause the desired receive signal to increase above the receive signal power level, which can saturate the RF components in the receiver chain and cause nonlinearities.

In the present implementation, antennas 606a and 606b in receiver chain 600 receive offending transmit signals, such as offending transmit signals 110, and a desired receive signal at a combined input power level. Automatic gain controller 640 adjusts receiver chain 600 in response to the combined input power level such that receiver chain 600 maintains operation in a linear region at the combined input power level. Thus, RF components in receiver chain 600 do not saturate or cause nonlinearities. Automatic gain controller 640 also adjusts receiver chain 600 in response to the combined input power level such that the noise figure of receiver chain 600 is minimized. Although FIG. 6 shows that receiver chain 600 has two antennas with respective LNAs, phase shifters, and VGAs, only a portion of receiver chain 600 is shown in FIG. 6. In practice, receiver chain 600 may have any number antennas with respective LNAs, phase shifters, and VGAs. Likewise, although FIG. 6 shows that combiner 630 in receiver chain 600 combines two signals, in practice, combiner 630 may combine any number of signals. Receiver chain 600 may include additional components, such as additional signal conditioning circuitry.

Figure 7:
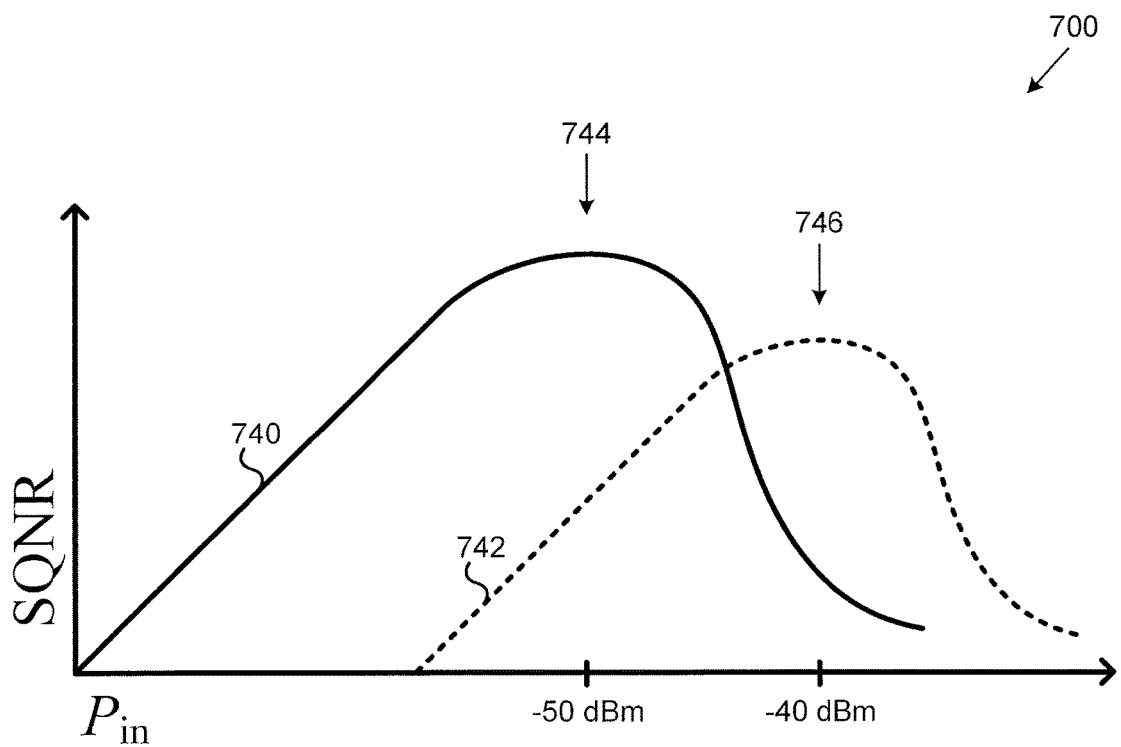
FIG. 7 illustrates a portion of an exemplary signal to quantized noise ratio (SQNR) graph according to one implementation of the present application.

FIG. 7 illustrates a portion of an exemplary signal to quantized noise ratio (SQNR) graph according to one implementation of the present application. SQNR graph 700 in FIG. 7 represents the SQNR of a receiver chain, such as receiver chain 600 in FIG. 6, versus the combined input power level $P_{in}$. Relative dimensions of the SQNR and $P_{in}$ shown in FIG. 7 may be exaggerated for the purposes of illustration.

As illustrated in FIG. 7, SQNR graph 700 includes traces 744 and 746. Traces 744 and 746 represent the SQNR of the receiver chain for different configurations of an automatic gain controller, such as automatic gain controller 640. As shown in FIG. 7, traces 744 and 746 have maxima 744 and 746 respectively around combined input power levels of negative fifty decibel-milliwatts (−50 dBm) and negative forty decibel-milliwatts (−40 dBm) respectively. Maxima 744 and 746 indicate the maximum combined input power level $P_{in}$ for which a given configuration of the automatic gain controller maintains operation in a linear region. Maxima 744 and 746 also indicate the combined input power level $P_{in}$ for which a given configuration of the automatic gain controller minimizes the noise figure of the receiver chain. Thus, when the receiver chain receives a desired input signal and offending transmit signals at a combined input power level of approximately negative fifty decibel-milliwatts (−50 dBm), the automatic gain controller adjusts the receiver chain to a configuration corresponding to trace 740, such that maximum 744 occurs approximately at negative fifty decibel-milliwatts (−50 dBm). When the receiver chain receives a desired input signal and offending transmit signals at a combined input power level of approximately negative forty decibel-milliwatts (−40 dBm), the automatic gain controller adjusts the receiver chain to a configuration corresponding to trace 742, such that maximum 746 occurs approximately at negative forty decibel-milliwatts (−40 dBm). The automatic gain controller can adjust the receiver chain in numerous other configurations, only examples of which are shown in FIG. 7.

By utilizing automatic gain controller 640 to adjust receiver chain 600 such that receiver chain 600 maintains operation in a linear region at a combined input power level, a full duplex transceiver can tolerate coupling between a transmitter and receiver without nonlinearities or increased noise figure. As a result, the full duplex transceiver can improve the accuracy of active cancellation techniques that rely on a duplicate signal subtracted from the receive signal. Additionally, the full duplex transceiver can be used in conjunction with the dummy antenna row configurations discussed in relation to FIGS. 2 and 3 and/or the null formation techniques discussed in relation to FIGS. 4 and 5 to achieve full duplex communication.

Thus, various implementations of the present application achieve a full duplex wireless communication system that overcomes the deficiencies in the art by using a transceiver with reduced coupling of transmitter and receiver. From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

The invention claimed is:

1. A full duplex transceiver comprising:
   a phased array antenna panel transmitter;
   a phased array antenna panel receiver;
   at least one dummy antenna row situated between said phased array antenna panel transmitter and said phased array antenna panel receiver, said at least one dummy antenna row having at least one dummy antenna connected to a terminating resistor.

2. The full duplex transceiver of claim 1, wherein said terminating resistor is a surface mount resistor on said phased array antenna panel receiver.

3. The full duplex transceiver of claim 1, wherein said terminating resistor is situated in a radio frequency (RF) front end chip in said phased array antenna panel receiver.

4. The full duplex transceiver of claim 1, wherein said phased array antenna panel transmitter forms a desired radio frequency (RF) transmit beam at a target angle, and forms a null at an angle so as to minimize reception of offending transmit signals at said phased array antenna panel receiver.

5. The full duplex transceiver of claim 4, wherein said phased array antenna panel transmitter forms said desired RF transmit beam and said null by assigning complex weights to a plurality of antennas in said phased array antenna panel transmitter.

6. The full duplex transceiver of claim 5, wherein said full duplex transceiver determines said complex weights using convex optimization.

7. The full duplex transceiver of claim 1, wherein said phased array antenna panel transmitter comprises at least one dual-polarized antenna.

8. A full duplex transceiver comprising:
a phased array antenna panel transmitter;
a phased array antenna panel receiver receiving offending transmit signals from said phased array antenna panel transmitter and a desired receive signal at a combined input power level;
an automatic gain controller configured to adjust a receiver chain in said phased array antenna panel receiver such that said receiver chain maintains operation in a linear region at said combined input power level.

9. The full duplex transceiver of claim 8, wherein said receiver chain comprises:
a low-noise amplifier (LNA);
a variable-gain amplifier (VGA);
a driver amplifier (DA);
a mixer;
a transimpedance amplifier (TIA);
wherein said automatic gain controller is configured to adjust said LNA, said VGA, said DA, and said TIA.

10. The full duplex transceiver of claim 9, wherein said LNA is linear up to negative eight decibel-milliwatts (−8 dBm) output power, said VGA is linear up to negative eight decibel-milliwatts (−8 dBm) output power, said DA is linear up to negative eight decibel-milliwatts (−8 dBm) output power, said mixer is linear up to ten decibel-milliwatts (10 dBm) output power, and said TIA is linear up to ten decibel-milliwatts (10 dBm) output power.

11. The full duplex transceiver of claim 8, wherein said phased array antenna panel transmitter forms a desired radio frequency (RF) transmit beam at a target angle, and forms a null at an angle so as to minimize reception of said offending transmit signals at said phased array antenna panel receiver.

12. The full duplex transceiver of claim 11, wherein said phased array antenna panel transmitter forms said desired RF transmit beam and said null by assigning complex weights to a plurality of antennas in said phased array antenna panel transmitter.

13. The full duplex transceiver of claim 12, wherein said full duplex transceiver determines said complex weights using convex optimization.

14. The full duplex transceiver of claim 8, wherein said phased array antenna panel transmitter comprises at least one dual-polarized antenna.

15. A full duplex transceiver comprising:
a phased array antenna panel transmitter;
a phased array antenna panel receiver receiving offending transmit signals from said phased array antenna panel transmitter and a desired receive signal at a combined input power level;
at least one dummy antenna row situated between said phased array antenna panel transmitter and said phased array antenna panel receiver, said at least one dummy antenna row having at least one dummy antenna connected to a terminating resistor;
an automatic gain controller configured to adjust a receiver chain in said phased array antenna panel receiver such that said receiver chain maintains operation in a linear region at said combined input power level.

16. The full duplex transceiver of claim 15, wherein said receiver chain comprises:
a low-noise amplifier (LNA);
a variable-gain amplifier (VGA);
a driver amplifier (DA);
a mixer;
a transimpedance amplifier (TIA);
wherein said automatic gain controller is configured to adjust said LNA, said VGA, said DA, and said TIA.

17. The full duplex transceiver of claim 16, wherein said LNA is linear up to negative eight decibel-milliwatts (−8 dBm) output power, said VGA is linear up to negative eight decibel-milliwatts (−8 dBm) output power, said DA is linear up to negative eight decibel-milliwatts (−8 dBm) output power, said mixer is linear up to ten decibel-milliwatts (10 dBm) output power, and said TIA is linear up to ten decibel-milliwatts (10 dBm) output power.

18. The full duplex transceiver of claim 15, wherein said phased array antenna panel transmitter forms a desired radio frequency (RF) transmit beam at a target angle, and forms a null at an angle so as to minimize reception of said offending transmit signals at said phased array antenna panel receiver.

19. The full duplex transceiver of claim 18, wherein said phased array antenna panel transmitter forms said desired RF transmit beam and said null by assigning complex weights to a plurality of antennas in said phased array antenna panel transmitter.

20. The full duplex transceiver of claim 19, wherein said full duplex transceiver determines said complex weights using convex optimization.

* * * * *